Sept. 12, 1961  R. A. CAMPBELL  2,999,587
AUTOMATIC DIODE SORTER

Filed Aug. 12, 1957  8 Sheets-Sheet 1

Richard A. Campbell,
INVENTOR

By Spensley and Horn
ATTORNEYS

Fig. 12.

Sept. 12, 1961 R. A. CAMPBELL 2,999,587
AUTOMATIC DIODE SORTER
Filed Aug. 12, 1957 8 Sheets-Sheet 5

Fig. 12.

RICHARD A. CAMPBELL,
INVENTOR.

By Spensley and Horn
ATTORNEYS.

Sept. 12, 1961   R. A. CAMPBELL   2,999,587
AUTOMATIC DIODE SORTER

Filed Aug. 12, 1957   8 Sheets-Sheet 7

Richard A. Campbell,
INVENTOR.

By Spensley and Horn
ATTORNEYS.

Sept. 12, 1961  R. A. CAMPBELL  2,999,587
AUTOMATIC DIODE SORTER
Filed Aug. 12, 1957  8 Sheets-Sheet 8

RICHARD A. CAMPBELL,
INVENTOR.

By Spensley and Horn
ATTORNEYS.

United States Patent Office 2,999,587
Patented Sept. 12, 1961

2,999,587
AUTOMATIC DIODE SORTER
Richard A. Campbell, Los Angeles, Calif., assignor to Pacific Semiconductors, Inc., Culver City, Calif., a corporation of Delaware
Filed Aug. 12, 1957, Ser. No. 677,525
22 Claims. (Cl. 209—73)

This invention relates to an apparatus for testing and sorting unilaterally conducting electronic devices and more particularly, to an apparatus for automatically segregating a plurality of semiconductor diodes according to certain predetermined direct current characteristics.

In the present state of the semiconductor diode manufacturing art the diodes produced have varying electrical characteristics. Many of the completed devices will, for any of a number of reasons, not function as diodes at all while the majority of those that do will have varying levels of performance in relation to certain prescribed criteria.

Heretofore, the testing and sorting of the completed devices was a manually performed operation, hence it was slow, costly and subject to human error.

As a matter of statistical probability, there will usually be a certain percentage of devices of a given lot which will have electrical characteristics meeting the most rigid specifications. An automatic tester must therefore selectively sort the completed devices in some sort of order of decreasing electrical performance characteristics.

It is therefore a primary object of this invention to provide an apparatus for automatically testing and sorting a plurality of unilaterally conducting electronic devices.

Another object of this invention is to provide an apparatus for automatically electrically testing a plurality of semiconductor devices and physically segregating such devices in response to the tests performed.

Still another object of this invention is to provide an apparatus for measuring predetermined electrical characteristics of a plurality of semiconductor devices and to automatically segregate these devices in response to the measurements made.

A further object of this invention is to provide an apparatus for automatically electrically testing a plurality of semiconductor diodes and to physically segregate the tested diodes in response to the tests in order of decreasing performance characteristics.

A still further object of this invention is provide an automatic or asymmetrically conducting electronic device sorting machine.

Yet another object of this invention is to provide an automatic semiconductor diode sorting machine.

The present invention will be described with reference to a machine for sorting a plurality of hermetically sealed semiconductor diodes, for purposes of clarity and simplicity only, it will be appreciated by one skilled in the art that the machine of the present invention may be adapted for testing and sorting other semiconductor devices such as transistors, for example, or other unilaterally or asymmetrically conducting electronic devices which may not necessarily be hermetically sealed.

According to the presently preferred embodiment of this invention, the diodes to be tested are placed in a vibratory feeder which automatically aligns each diode into end-to-end relationship and feeds them to a test station where a series of predetermined direct current characteristic tests are performed.

Up to nine different test voltage or current analogues may then be applied to each diode in any predetermined sequence to measure such things as reverse and forward current and saturation voltage. The measured direct current characteristics are compared with predetermined limits as standards which have previously been set by a human operator. On the basis of these comparisons, the apparatus of the present invention will make a "Yes" or "No" decision as to whether the diode is within each of the predetermined limits.

After all of the tests are completed upon the diode under test, it may be that it will have met the requirements for several of the predetermined limits. Since certain types of diodes may be more desirable than others, the present apparatus will, on the basis of the tests performed, classify the diodes with a preselected order of preference. They are then directed into appropriate chutes which lead to associated bins.

The novel features which are believed to be characteristic of the present invention both as to its organization and method of operation together with further objects and advantages thereof will be better understood from the following description considered in connection with the accompanying drawings in which a presently preferred embodiment is illustrated by way of example. It is to be expressly understood, however, that the drawings are for the purposes of illustration and description only and are not intended as a definition of the limits of the invention.

In order to clearly describe the operation and utility of the present invention its use will be discussed in connection with the testing of semiconductor devices such as the semiconductor diode described and claimed in copending United States patent application, Serial No. 497,353, filed March 21, 1955, by Justice N. Carman, Jr. for "Glass Sealed Crystal Rectifier," now Patent No. 2,881,369, and assigned to the assignee of the present invention.

Figure 1:
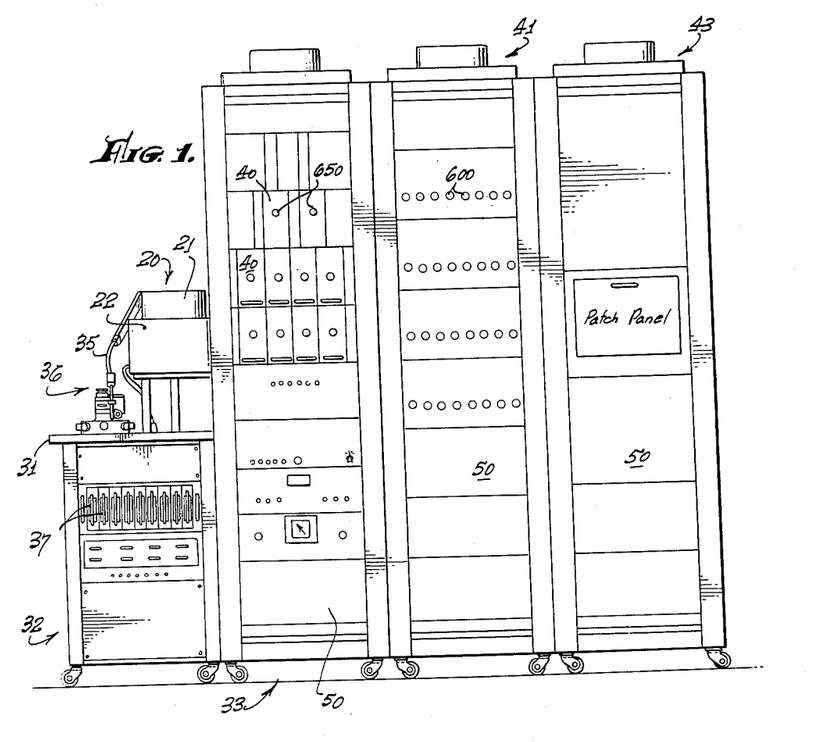
FIGURE 1 is a front elevation of an assembly drawing of the apparatus of the presently preferred embodiment of the invention.
Figure 18:
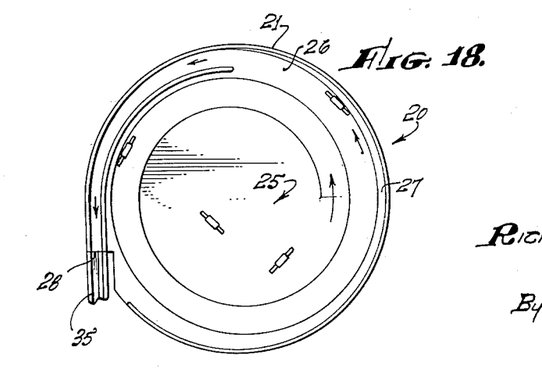
FIGURE 18 is a plan view of the vibratory feeder of FIGURE 1.

Referring now to the drawings, wherein like reference characters designate like or corresponding parts throughout the various figures, there is shown in FIGURE 1 an overall assembly in block form of the presently preferred embodiment of the invention. A vibratory unit 20 including a bowl 21 and a power unit 22 is used to initially receive and physically aligns each diode to be tested in end-to-end relationship. Such vibrating units are known to the art and are manufactured, for example, under the registered trademark, "Syntron" by the Syntron Company. The receiving bowl 21 of such a vibratory unit, referring to FIGURES 1 and 18, is substantially cylindrical with the bottom surface 25 slightly tapered from the center to the periphery. A spiraling ramp 26 extends from the bottom surface upward along the inner periphery of the wall 27 to a position proximate the upper edge of the wall where an exit 28 is provided. The power unit 22 vibrates the bowl 21 in such a manner that cylindrical objects such as the diodes being tested are moved to the outer periphery of the bottom surface and caused to proceed up the ramp in end-to-end relation. Thus, a large number of devices placed in the bowl 21 will be discharged from the exit 28 in and end-to-end position in a substantially steady stream. The vibratory unit 20 is mounted upon an upper plate 31 forming a part of the relay cabinet 32 for the testing apparatus assembly.

Referring now particularly to FIGURE 1, an output tube 35 is connected to the end of the exit 28 to feed the discharged diodes from the vibratory feeder into the mechanical handler 36. Below the mechanical handler and removably mounted within the relay cabinet are a plurality of bins 37. In the second cabinet 33 are mounted the various voltage and current regulators 40. Cabinet 41 houses the decision circuits 42, while cabinet 43 contains the patch panel. The various power supplies 50 are contained in cabinets 33, 41 and 43 as shown.

Figures 2, 3, 9, 10, 11:
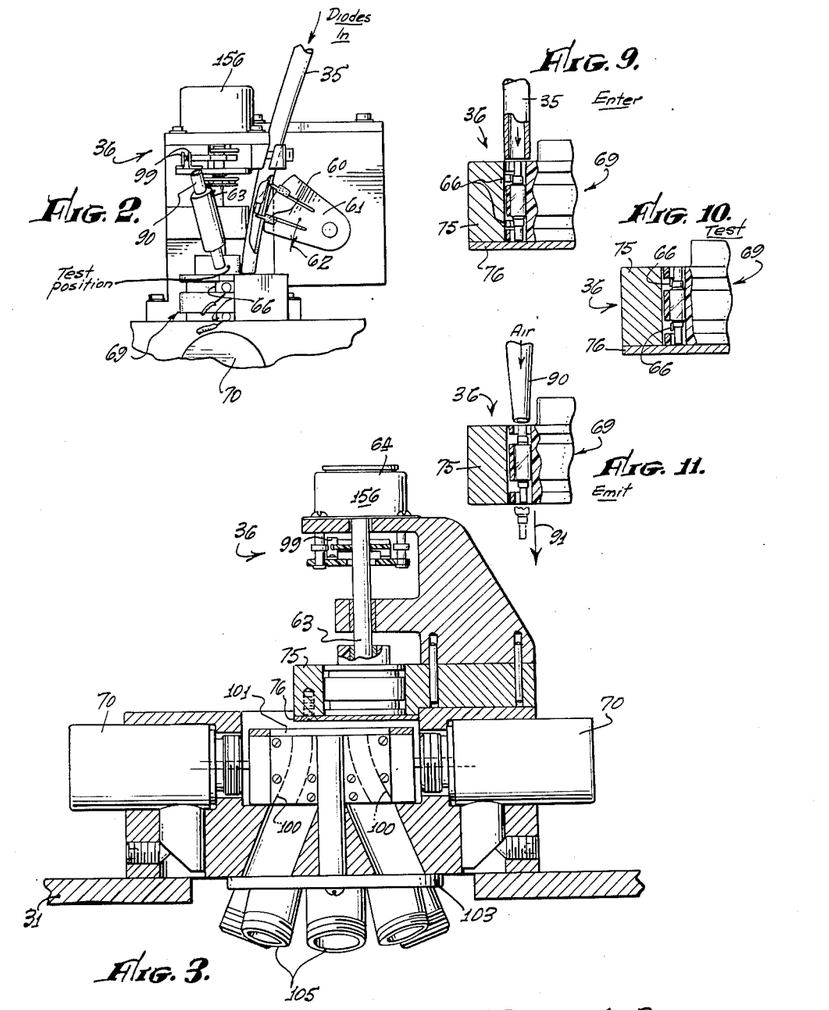
FIGURE 2 is an assembly drawing of the mechanical handler of the embodiment shown in FIGURE 1 with the vibratory feeder apparatus being omitted.
FIGURE 3 is an enlarged view partly in section of the mechanical handler of FIGURE 2 showing how it is connected to the chutes leading to the bins.
FIGURE 9 is a view partly in section showing the test diode in the enter position of the carrier of FIGURE 8 which is just below the inlet tube of FIGURE 2.
FIGURE 10 is a view partly in section of the test diode in the test station of the carrier of FIGURE 8.
FIGURE 11 shows the diode in emit station of the carrier of FIGURE 8 just prior to its being ejected into the appropriate chute by the air jet hose of FIGURE 2 and FIGURE 4.

In operation, a series of diodes are fed into chute 35 from the vibratory feeder 20 as previously described. The first diode comes to rest upon resilient finger 60 of control gate 61, as may best be seen in FIGURE 2. The first diode is thereafter fed into enter position 80 of diode carrier 69 as may best be seen in FIGURES 6 and 8 from feed chute 35 upon energization of control coil 85 shown in FIGURE 4. The control coil 85 snaps the control gate 61 in a downward direction as indicated by arrow 62 upon being energized. Thereafter the carrier will be turned 30° in a clockwise direction by rotation of shaft 63 as it is turned upon energization of ratchet coil 156. This can best be seen in FIGURES 4 and 6. Thus the enter position 80 will now be 30° in a counterclockwise direction away from the hole in the carrier 69 which previously was coincident therewith. The first diode will be in test position 81 where the various electrical tests as will be hereinafter described are serially performed.

Figures 4, 5, 6, 7, 8:
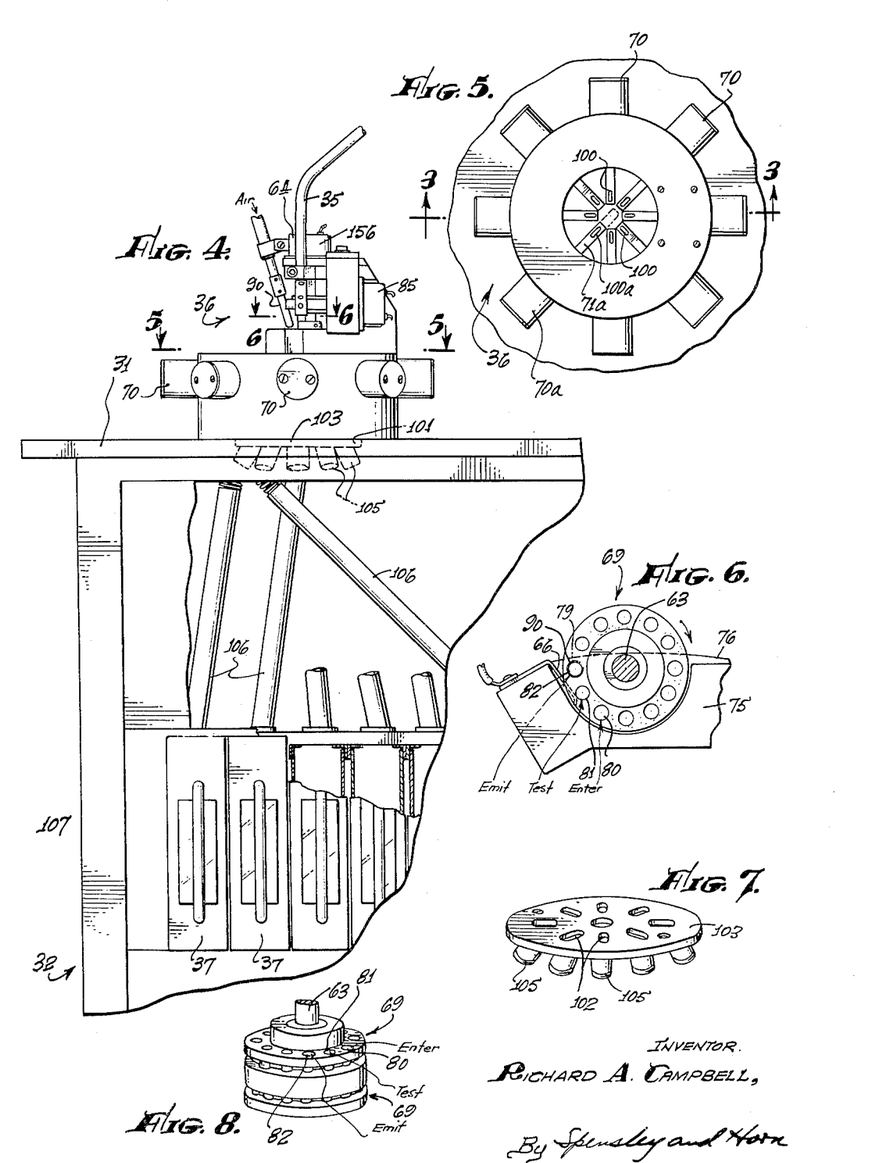
FIGURE 4 is a view of the mechanical handler without the vibratory feeder shown in FIGURE 1, with the panel above the bins partly cut away to show the interconnection between the bins and the mechanical handler through the chutes.
FIGURE 5 is a view taken along line 5—5 of FIGURE 4.
FIGURE 6 is a view taken along line 6—6 of FIGURE 4.
FIGURE 7 is a view in perspective showing the outlet plate which connects the chutes of FIGURE 4 with the mechanical handler output carrier.
FIGURE 8 is a view in perspective of the mechanical carrier into which the diodes are fed in the mechanical handler.

In the test position 81 of FIGURE 6, the test clips 66 make contact with the diode electrodes. After the testing operation is completed the ratchet coil 64 is again energized advancing the carrier another 30° in the clockwise direction to emit position 82 of FIGURE 6. Each time the carrier is rotated one position, another diode is fed into the carrier by the control gate 61 which is actuated in synchronism with the ratchet coils as previously described.

Now, with the diode in the emit position in accordance with the sorting circuits decision one of the solenoids 70 will be energized. These solenoids may be seen in FIGURES 3, 4 and 5. Upon energization, the appropriate plunger, herein plunger 71a will advance toward the center of the carrier to assume the position as indicated by the dotted line to be under the emit position 82 as may best be seen in FIGURE 5.

In FIGURE 6 there is shown a top view of the test clip holder 75 which is the mounting for the diode test clip 66. Below the carrier 69 is a plate 76 which holds the diode in the carrier 69. However, coincident with emit station 82 is a hole 79 in plate 76 through which the diodes fall after having been tested. To insure that the diode to be emitted is positively sent down at the appropriate time from the emit station 82, a downward air jet is directed through hose 90 as may be seen in FIGURES 2 and 4. As may be seen in FIGURE 11, the air stream will force the diode down in the direction of arrow 91.

In synchronism with the projection of the air stream by action of a valve mechanism, not shown, to direct air under pressure from a source not shown the plunger 71a of FIGURE 5 will be under the carrier emit position 82. All of the solenoids are spring loaded, thus after extension of plunger 71a under station 82 it will retract after a predetermined time delay. This time delay is controlled by the reset pulse from reset thyratron 160 resetting associated flip-flop 510. Each plunger 71 has a vertical hole 100 therethrough, the hole in plunger 71a being designated by the number 100a. The guide plate 103 of FIGURE 7 has holes 102 extending vertically therethrough. The guide plate 103 further has outlet nipples 105 coextensive with the holes 102. The nipples 105 are each connected to flexible hoses 106 which are in turn connected to bins 107 (see FIGURE 4). After the plunger 71a of spring loaded solenoid 70a is energized the test diode will be fed into the appropriate bin 107 connected through the hose 106 associated therewith.

Figure 12:
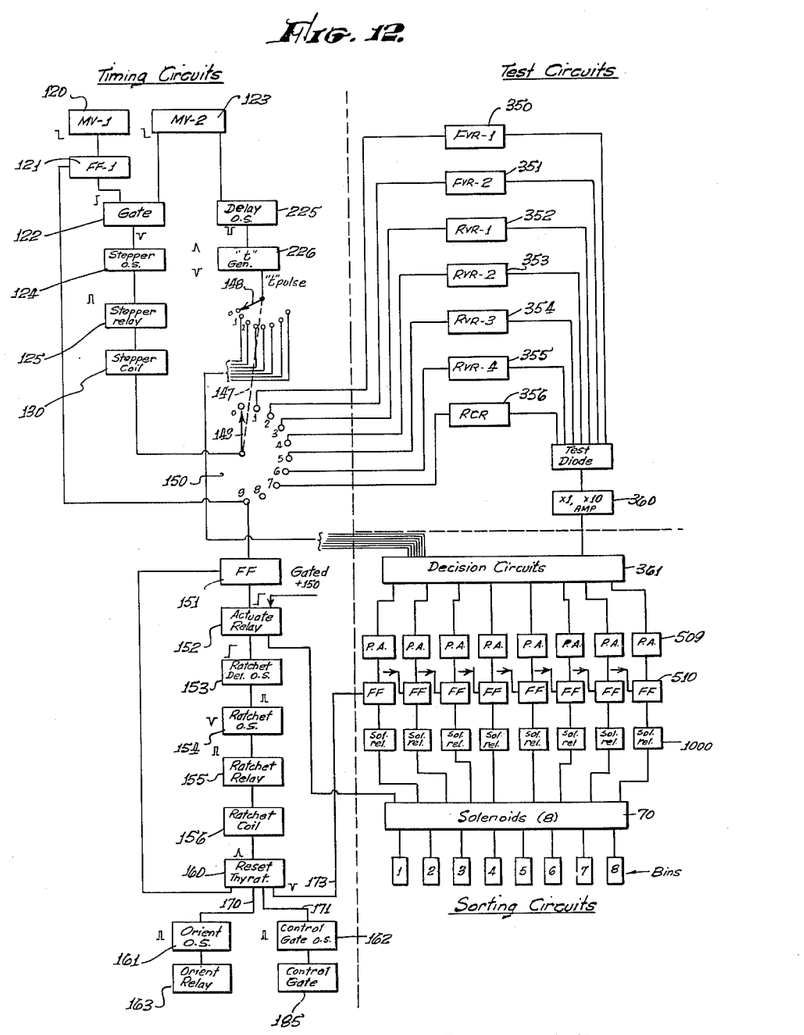
FIGURE 12 is a block diagram of a system for electrically testing and sorting a plurality of diodes in accordance with the present invention.

Now let us consider the overall functional block diagram of FIGURE 12 to explain the sequential energization of the mechanical components above discussed. As indicated by the dotted lines, basically the automatic diode sorter of the present invention consists of three functional components which may be termed the test circuits, the sorting circuits and the timing circuits.

In the presently preferred embodiment the test circuits consist of a plurality of forward voltage regulators 350 and 351, a plurality of reverse voltage regulators 352–355, a reverse current regulator 356, two direct current amplifiers 360 and a stepping switch assembly 150. These circuits generate and regulate the test voltages and currents for application to the diode under test. The stepping switch assembly, as will be described hereinafter, provides the means of programming the application of the test voltages and currents. The sorting circuits consist of a plurality of decision circuits 361, amplifiers 509 and the mechanical diode handler 36 to which reference has previously been made. The function of the sorting circuits is to compare the output of the diodes when various test circuit voltages and current analogues are applied thereto with that of predetermined specifications and to classify and segregate the diodes into the appropriate bins 107. The operation in terms of the overall system will now be explained with reference to the sequence of events.

The timing circuits include all of the interconnected blocks 120—185 to the left of the vertical dotted line of FIGURE 12. Their function is to establish the measurement and sorting program, and to provide auxiliary controls such as diode orientation and Syntron feed.

A detailed description of the mechanical handler to physically present the diode to the appropriate test position has been previously explained.

Referring now to FIGURE 12, the sequence of events begins with a simultaneous energization of free running multivibrators 120 and 123. The exact details of the multivibrators are not herein disclosed as they are of a type well known to the art. A description of a typical multivibrator may be found in "Theory and Application of Electron Tubes," by H. J. Reick, published in 1944, at pages 362 to 365. The diode sorter of the present invention has a variable diode handling rate. This rate is determined by the output of multivibrator 120 which controls the mechanical handler 36. When multivibrator 120 transfers to its negative state as indicated by curve 200 of FIGURE 13 at time $t=0$, flip-flop 121 is turned "on" as indicated by curve 201 in FIGURE 13. In accordance with well known practice, flip-flop 21 may conveniently be a conventional Eccles-Jordon multivibrator.

The free running multivibrator 123 determines the test duration period in a manner hereinafter to be described. The output of multivibrator 123 is applied to the input of "and" gate 122, as is the output from flip-flop 121. Gate 122 may be an "and" gate of the type as defined in an article entitled "Standards on Electronic Computors: Definition of Terms, 1950" in "Proceedings of the IRE," for March 1951, pages 271 through 277 inclusive. In order for gate 122 to generate an output signal, the concurrance of a positive signal from flip-flop 121 is required when multivibrator 123 is changing from its positive to its negative state. It may be seen in FIGURE 13 that a negative output pulse appears in curve 203 whenever curve 202 is going negative from the time $t=0$ until $t=390$ as during this entire time interval flip-flop 121 is in the "on" state. These negative output pulses from gate 122 appear at time $t=40$, $t=80$, etc., but none appear after $t=390$ (until sometime much later when flip-flop 121 again becomes positive) as after $t=390$ flip-flop 121 is in the "off" state.

Figure 13:
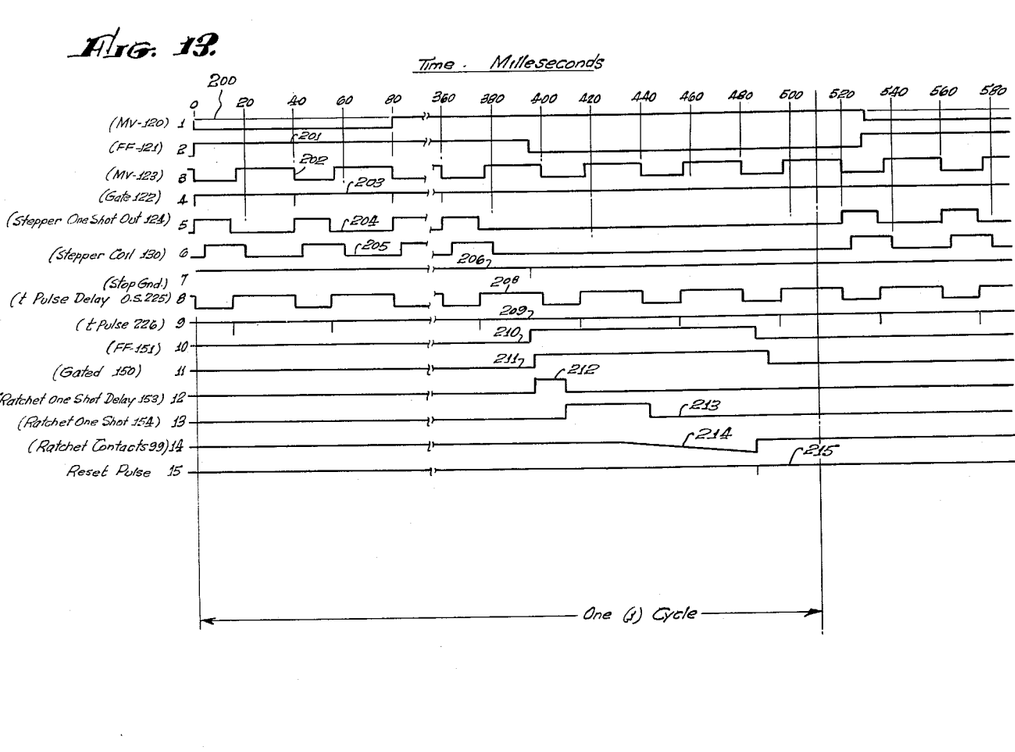
FIGURE 13 is a graph showing, as a function of time, the voltages developed at various of the circuits shown in block form in FIGURE 12.

The negative output signals from gate 122 will fire stepper one shot multivibrator 124 as is graphically represented in FIGURE 13. Each time a pulse appears at the output of gate 122 the stepper one shot multivibrator 124 goes positive, for a fixed time duration, i.e., at times $t=0$, $t=40$, $t=80$, etc., as is indicated by curve 204. Stepper one shot multivibrator 124 may be of any type of one shot multivibrator known to the art. The output of multivibrator 124 energizes stepper relay 125 which in turn energizes stepper coil 130 after a short time delay. Relay 125 may be a mercury relay such as the Western Electric 276B.

A short time delay after the stepper one shot multivibrator 124 turns off, the stepper coil 130 is deenergized thus advancing the contact arm 149 of switch 150 one step from contact 0 to contact 1. The output curve 205 of coil 130 may be seen in FIGURE 13 to always be delayed in time, some 5 milliseconds herein, after the turning off of stepper one shot multivibrator 124 as previously mentioned. The physical stepping of the contact arm 149 of switch 150 occurs upon the deenergizing of coil 130 after the energization of the coil had previously cocked the stepper switch contact. Stepper switch 150 may be any type of rotary stepping switch such as the CP–Clare type 20.

The stepping of the contact arm 149 of switch 150 continues until it hits point 9 at time $t=390$ as is indicated by curve 206. This produces a negative pulse which causes flip-flop 121 to turn "off" so that no further steps of switch 150 are taken. Thus, for each cycle of multivibrator 120, the stepper switch steps ten times and then stops. If we assume the use of a stepper switch which is a twenty step relay with a double arm rate, it will take four cycles to make one complete revolution of the switch.

The same pulse that turns flip-flop 121 "off" turns flip-flop 151 "on" to start the sequence which culminates in the actuation of control gate 61, thus pushing the next diode in tube 35 into the mechanical carrier 69 at the enter position; all this, of course, being after a predetermined time delay. This time delay is approximately 90 milliseconds in the present embodiment of the invention.

The above sequence occurs in the following manner: The output signal, from flip-flop 151 represented by curve 210 in FIGURE 13 energizes cathode follower driven actuate relay 152. Relay 152 has its output voltage applied to two different circuits simultaneously. The output voltage from relay 152 is applied to solenoid circuit 1000 which latter circuit will hereinafter be explained. It is also applied to the air solenoid, not shown, to send the air jet through hose 90 for a period of time determined by the ratchet one shot multivibrator and to ratchet delay one shot multivibrator 153 which may be the same type of multivibrator as multivibrator 124. This causes multivibrator 153 to produce a positive pulse at time $t=390$ as is indicated by curve 212.

After a short time delay, determined by the positive cycle of multivibrator 153, ratchet one shot multivibrator 154 is energized for a period of approximately thirty-five milliseconds as may be seen on curve 213. The output signal from multivibrator 154 energizes ratchet relay 155 which in turn energizes ratchet coil 156 causing ratchet contacts 99 (see FIGURE 3) to open and advances the carrier 30°. The contacts 99 do not close until $t=485$ as they remain open during the negative slope of curve 214 of FIGURE 13.

The positive pulse at $t=485$ from the ratchet contacts 99 energizes reset thyratron 160. At this time the diode is still sitting in the mechanical gate 61 above the carrier enter position 80.

The reset thyratron 160 may be any type of thyratron well known to the art. When the thyratron 160 fires, it generates a reset pulse indicated at $t=485$ of curve 215 which is simultaneously applied to the following circuits through output leads 170, 171, 172 and 173 respectively. Through lead 170 it energizes the orient one shot multivibrator 161; through lead 171 it energizes the control gate one shot multivibrator 162 and through lead 172 it turns off the flip-flop 151 as may be seen at $t=485$ on curve 210. Also through lead 173 the output pulse from reset thyratron 160 resets all of the decision circuit flip-flops, putting them in the "off" state.

The output signal from the orient multivibrator 161 in turn energizes orient relay 163, the function and operation of which will hereinafter be explained with reference to FIGURE 14. It can be stated at this time, however, that the purpose of relay 163 is to electrically orient the diode under test. The output signal from the control gate one shot multivibrator operates the control gate 61 as was previously explained, thus allowing the next diode in line to be released to the carrier 69 at the enter position 80. The diode in the enter position in the carrier will be held therein from underneath by plate 76 as may best be seen in FIGURE 6.

For clarity it should be stated that while the carrier advanced 30° upon energization of ratchet coil 156, no diode was at that time carried therein.

Now at time $t=80$ multivibrator 120 will go to its "on" state as it is a conventional free running multivibrator which has a non-symmetrical output. Its "on" time has been herein set at 450 milliseconds. The "on" time of multivibrator 120 is variable having been set "off" for 450 milliseconds, thus it will again be on at $t=530$ as may be seen on curve 200 of FIGURE 13. The "on" time of multivibrator 120 is variably controlled by changing the time constant in its grid circuit, this by switching a resistance therein. This circuit is not shown as it is one well known to the art. The sum of the "on" and "off" time is what governs the hourly rate of the apparatus of the present invention which may be varied from 2000 to 8000 diodes per hour.

At a later time multivibrator 120 again becomes negative, thus causing the sequence from gate 122 to the stop ground of the switch 150 to repeat. During this second sequence switch 150 again steps from contact 0 to contact 9 thereof, but still the first diode to be tested is not yet in the test position, it being in the enter position 80 of the carrier.

After switch 150 again reaches contact 9, on stop ground, the sequence as above described from the turning "on" of flip-flop 151 will be repeated. Thus, with the energization of ratchet coil 156 the carrier will move the diode to the test position 81. Subsequently, control gate 185 will move the next diode into the enter position resulting in two diodes then being in the carrier, i.e., the first diode will be in the test position 81 and the second diode in the enter position 80.

During the first sequence resulting in the energization of orient relay 163 nothing occurred as we had assumed no diode to then have been in the test position. Now during the second sequence with the first diode in the test position the orient relay will operate. The orient relay contacts are shown in detail in FIGURE 14.

The orienter one shot multivibrator 161 momentarily energizes the relay coil, not shown. The relay is so constructed that contact arms 300 and 301 are mechanically in parallel. Upon energization of the coil contact arms 302 switches the test diode to the grid circuit (not shown) of orient thyratron 307 through lead 310 by making contact with terminals 305. If the test diode polarity is reversed with respect to the test contacts the thyratron fires and energizes the two parallel relay arms 300 and 301 which are in the cathode circuit, thus effectively switching the diode test contact leads to give the desired polarity. If, on the other hand, the diode polarity is correct to begin with, the thyratron will not fire and contact arms 300 and 301 will not switch as the relay coil associated therewith (not shown) will not be energized. To be certain that the thyratron is not conducting when the test diode is put into the grid circuit, the orienter pulses a cathode follower driven relay (not shown) that opens the thyratron plate circuit (not shown) and extinguishes the plate conduction if there be any.

To summarize, the operation of the timing circuits can be broken into three phases. Phase one is the period during which the stepper switch 150 operates and the solenoid relays are set up according to the decisions made. (The details of this phase will hereinafter be amplified). Phase two is the period in which the appropriate solenoid extends, the ratchet advances, one diode drops through the solenoid into the chute and to a bin, while another diode is set into the test clips in the test position. The third phase is the one in which the test diode is oriented, and the control gate drops the next diode in the enter position of the mechanical carrier.

Figure 14:
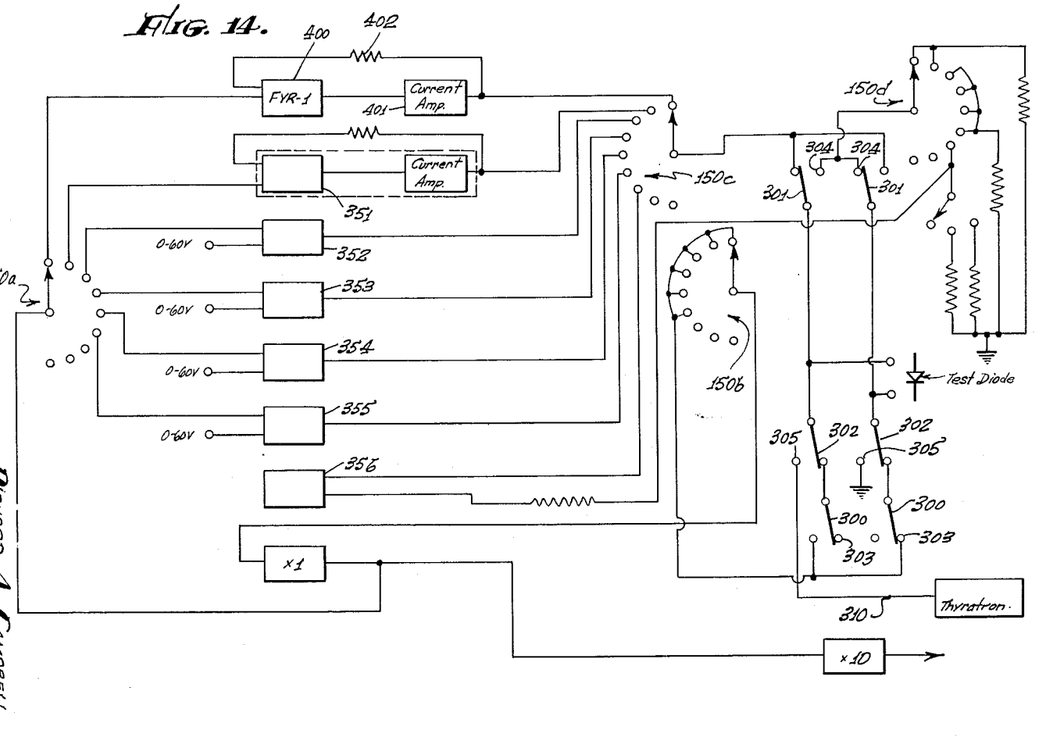
FIGURE 14 is a view partly in block form and partly in schematic of the part of the sorting circuit of the present invention.

Again referring to FIGURES 12 and 13, after multivibrator 120 again goes negative at time $t=x$ (some time beyond $t=530$ on curve 200 of FIGURE 13) the sequence resulting in the stepping of switch 150 from 0 to 9 repeats, this time causing voltages from voltage and current regulators 350 through 356 to sequentially be applied to the diode under test, as may be seen in FIGURE 12 and FIGURE 14. The contact arms of switches 150a, 150b, 150c, 150d and 150e are simultaneously stepping from 0 to 9 with the arm of switch 150 as they are all mechanically in parallel although electrically isolated.

In FIGURE 12, it may therein be seen that the output signal from multivibrator 123 is fed into delay one shot multivibrator 225 to produce an output signal represented by curve 208 in FIGURE 13 which in turn energizes "t" pulse generator 226 which may be a thyratron. The "t" pulse generator output signals or pulses, are represented by curve 209 of FIGURE 13, occurring approximately every 40 milliseconds in the example herein. The "t" pulses are sequentially and selectively presented to the decision circuits (hereinafter to be described) through switch 150e shown in FIGURE 12. Switch 150e is but one of the several parallel bands of switch 150.

Figures 20, 21:
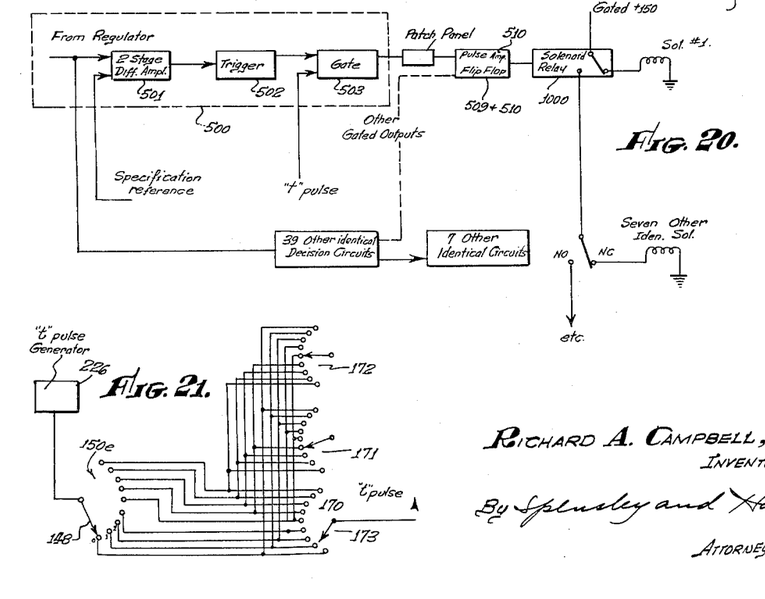
FIGURE 20 is a block diagram of one of the decision circuits together with its associated circuits.
FIGURE 21 is a schematic view showing the interconnection of the stepping switch and the t-pulse generator of FIGURE 1 together with the "t" pulse selector switches associated with the decision circuits.

As is indicated by dotted line 147 switches 150 and 151 are on the same shaft. Thus, when contact arm 149 is in the zero position as shown, the "t" pulse generator output contact arm 148 is also in the zero position, and so forth. Switch 150e is also shown in FIGURE 21 which shows how its output is coupled to each of the decision circuits 361, all of which are electrically connected in parallel. Only three of these switches 170, 171, and 172 are therein shown for purposes of clarity. It will be understood that there are 40 switches interconnected as shown. Switch 170 may be assumed to represent decision circuit 1 which associates with switch 171 representing the switch associated with decision circuit 2, etc.

By way of design optimization, it has been found desirable to have the $t$ pulses occur some time after each particular step of switch 150e, but prior to the next step so that the noise will be at a minimum, thus reducing the probability of a false triggering of the decision circuits 361. This result is achieved by the delay one shot multivibrator 225.

Before an explanation of the testing standard and sequence is described, a description of the operation of the test circuits 350–356 will be undertaken.

Figure 15:
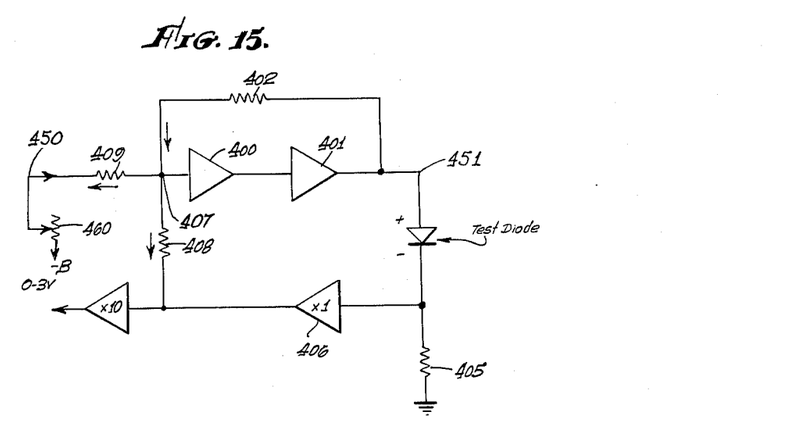
FIGURE 15 is a view partly in block form and partly schematic of a forward voltage regulator circuit used to perform a forward current test in accordance with the present invention.

In FIGURE 15 there is shown a schematic view of a forward current test circuit which is representative of that used for circuits 350 and 351 of FIGURE 12. Actually, only so much of FIGURE 15 as is enclosed within the dotted line represents circuit 350 and 351.

Figures 16, 17, 22:
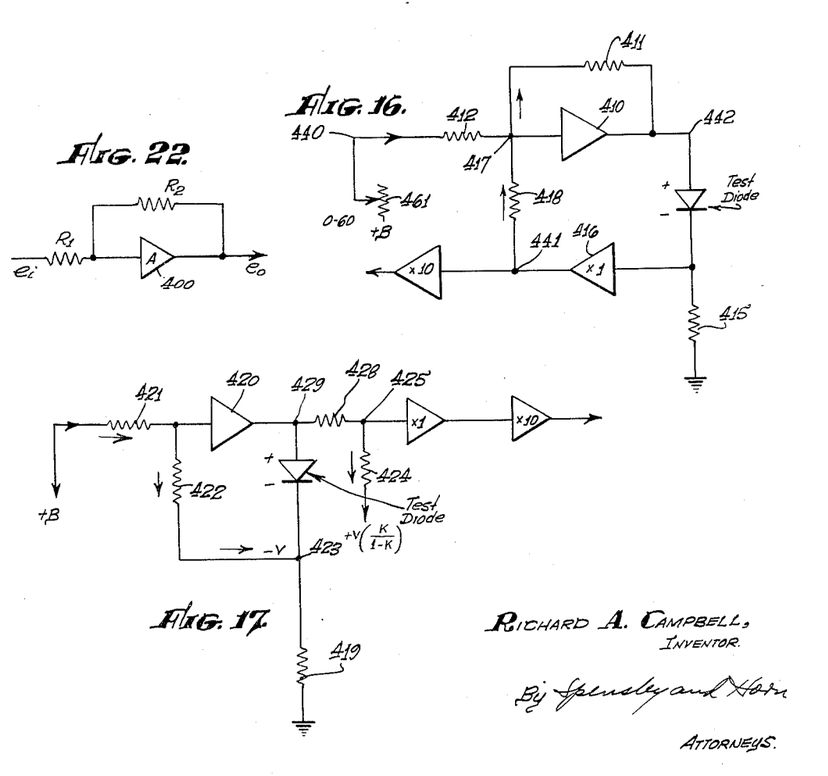
FIGURE 16 is a view partly in block form and partly schematic of a reverse voltage regulator circuit used to perform a reverse current test in accordance with the present invention.
FIGURE 17 is a view partly in block form and partly schematic of a reverse current regulator circuit used to perform a reverse voltage test in accordance with the present invention.
FIGURE 22 is a schematic view of an amplifier which is typical of those used in the regulators of FIGURES 15, 16 and 17.

The basic unit of the measuring circuits 350–357 is an operational amplifier represented by triangle 400 in FIGURE 15, 16 and 17. It may be a conventional high gain stabilized direct current amplifier. To simplify the analysis of this type of amplifier reference should be made to FIGURE 22. Herein two assumptions are to be made; namely, that the gain of the amplifier 400 approaches infinity and that its input impedance approaches infinity. It can be shown that if the above conditions are true that the following expressions are valid.

$$\frac{e_i}{R_1} = -\frac{e_o}{R_2} \text{ and since } K = \frac{e_o}{e_i} \text{ then } K = -\frac{R_2}{R_1}$$

This type of amplifier as exemplified in FIGURES 15, 16 and 17 is used in the three basic test circuits of circuits 350 to 356, namely the forward voltage regulator which supplies the forward voltage for the forward current tests, the reverse voltage regulator which supplies the voltage for the reverse current tests and the reverse current regulator which supplies the current for the reverse voltage test. It is the purpose of these novel regulators to maintain a constant voltage or current to the diode to be tested as a high degree of accuracy is required so that precise measurements will be obtained.

The forward voltage regulator circuit of FIGURE 15 includes chopper stabilized direct current amplifier 400 in series with cathode follower 401 which acts as a current amplifier. The closed loop gain of the loop including amplifier 400, cathode follower 401 and resistor 402 may be 0.5 for example. As soon as the input voltage is applied through resistor 409 an output voltage will appear across the test diode and its load which is a ten ohm precision resistor 405 herein. The test diode now will begin to conduct and a voltage drop will appear across the load resistor 405. This voltage is sensed and fed through unity gain direct current amplifier 406, which merely reverses the signal, to the input terminal 407 of the regulator circuit through resistor 408. This will boost the output voltage and compensate for the voltage drop across the diode load resistor 405. In this manner, the output voltage is regulated and the voltage across the test diode itself is kept at a constant value. A constant voltage is thus maintained across the diode and the current drawn by the diode is measured as the voltage drop across the precision load resistor 405. This voltage will be independent of the current drawn by the diode. By increasing the closed loop gain of the regulator by a factor of ten with the voltage across the diode being kept constant, this constant voltage has a range from 0–15 volts. The rating of the direct current amplifier 401 in the embodiment herein is five hundred milliamperes maximum.

The reverse voltage regulator of FIGURE 16 which is typical of regulators 352 to 355 includes direct current amplifier 410 with feed back resistor 411 coupled across it. The closed loop gain of the voltage regulator, including amplifier 410 and summing resistors 412, 411 and 418 may be, for example, −5 from terminal 440 to terminal 442 and −1 from terminal 441 to terminal 442. The voltage gain of amplifier 416 is −1. Due to the large swing of output voltage (it varies typically from zero to three hundred volts) the stabilization problem is less critical than in the forward voltage regulator circuit of FIGURE 15, hence no chopper stabilizer is provided in the reverse voltage regulator circuit. The diode current in this exemplary test circuit is limited to one milliampere, therefore no current amplifier is required. The operation of the reverse voltage generator is generally the same as that of the forward voltage generator above described. An input voltage is applied to the input of the regulator at terminal 440, causing a voltage to appear at the output terminal 442. The diode will begin to draw current, developing a voltage drop across the load resistor 415. This voltage will be inverted in polarity by the unity gain amplifier 416 and will appear at the regulator input terminal 441. The output voltage from the regulator at terminal 442 will thus increase by an increment equal to the voltage across resistor 415. In this manner a constant voltage will be maintained across the test diode independent of the current drawn thereby. The voltage across the precision resistor 415 will be linearly related to the test diode current.

The reverse current regulator shown in FIGURE 17 is used for the reverse voltage test and is shown in block form as regulator 356 in FIGURE 12. It includes an operational amplifier 420, current monitoring resistor 419, summing resistors 421 and 422, and a compensating network including resistors 428 and 424. +B voltage is applied to the input of amplifier 420 through resistor 421, causing a negative voltage to appear at the output point 429. The test diode will begin to draw current, developing a voltage drop across the current monitoring resistor 419. This voltage will be fed back to the input of amplifier 420 through resistor 422. The voltage at the output of amplifier 420 will continue to increase until the amplifier's input voltage reaches 0 or ground potential by reason of feedback through resistor 422. When this equilibrium condition has been reached, the voltage at point 423, −V, will be equal to the +B voltage times the ratio of resistors 422 to 421, inverted in polarity. The voltage, −V, will remain at this constant value independent of the voltage across the test diode. Since the constant voltage, −V, is across resistor 419, a constant current will be flowing through resistor 419. The constant voltage, −V, is also across resistor 422; hence, a constant current will flow through resistor 422 also. The current through the test diode is equal to the difference in currents through resistors 419 and 422 thus the test diode current is also constant, independent of impedance of the test diode. The voltage at point 429 is equal to the voltage drop across the test diode, plus the constant voltage, −V. A compensating network including resistors 424 and 428 cancels the effect of the constant voltage, −V, so that the voltage at terminal 425 is the true voltage drop across the test diode, attenuated by a factor K. The attenuation factor K is the ratio of the resistance of resistor 424 to the sum of the resistances of resistors 424 and 428. By returning resistor 424 to a positive voltage, equal in magnitude to the constant voltage V attenuated by $K/1-K$, the net effect is to produce, at point 425, the true diode test voltage, attenuated by K. Stated differently, the test diode voltage drop, plus the voltage drop −V across resistor 419, is attenuated by K. Added to this is the voltage $$+V\left(\frac{K}{1}-K\right)$$

which is attenuated by a factor of $(1-K)$ by resistor 428 and 424, leaving only the diode voltage attenuated by K at point 425.

As was previously indicated, the outputs from regulators 350–356 are sequentially applied to the test diode through switch 150 as is functionally indicated in FIGURE 12. The signal which represents the appropriate diode measurement by use of the circuits in FIGURES 15, 16 or 17 is compared with the specification voltage and/or current analog in a manner as indicated by the circuit of FIGURE 20. Therein the circuit circumscribed by dotted line 500 is representative of one of the forty decision circuits. Each of the decision circuits consists of a two-stage differential amplifier, a well known Schmitt trigger circuit 502 and gate 503.

The specification reference is established by a +/−B reference and is set by a potentiometer mounted on the face of cabinet 41 of FIGURE 1.

The appropriate specification reference signal and the appropriate regulator circuit which represents the test diode measurement, i.e., 350, 351 or 356 are both fed into differential amplifier 501 of FIGURE 20.

The output of the decision circuit is fed through a diode (not to be confused with the test diode) on the patch panel of FIGURE 19 hereinafter to be described to the appropriate flip-flop 510 associated with each decision circuit, one of which is shown within dotted line 500, through a pulse amplifier 509 as may be seen in FIGURES 19 and 20.

Referring to FIGURE 20, if the input from the appropriate regulator is more positive, for example, than that of the specification, the differential amplifier 501 output level will exceed the critical trigger voltage required to energize Schmitt trigger circuit 502.

The specification reference voltages are set by adjusting the various helipots 600 mounted on the face of cabinet 41 as may be seen in FIGURE 1. When Schmitt trigger circuit 502 is energized, gate 503 closes. Gate 503 will not permit passage of the t-pulse to trigger associated flip-flop 510 when the gate is closed. Therefore, when the t-pulse is applied, flip-flop 510 does not switch and the associated solenoid relay control circuit 1000 (see FIGURE 12) is not closed. This then registers a test specification successfully met.

If the opposite had occurred, gate 503 would have been open, and passage of the t-pulse would have closed the solenoid control circuit and a failure to pass a test specification would have been registered. Curve 211 of FIGURE 13 represents the output signal of the actuate relay 152 contacts. This voltage is applied to all of the eight solenoids 70 which are serially connected. The serial solenoid connections shown in FIGURE 20 are such that the solenoid associated with the first solenoid relay, which has not been energized by the above procedure, will be actuated by the application of the actuate signal 211. This then, results in the built in order of preference to which reference has previously been made.

Figure 19:
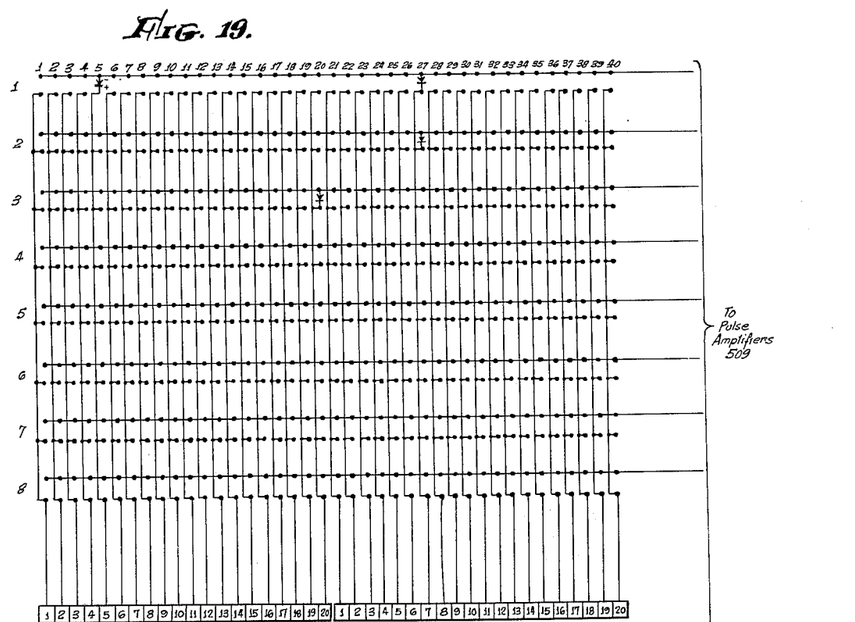
FIGURE 19 is a schematic view of the patch panel assembly.

In order to more clearly understand how a typical test run might be conducted let us assume the following with reference to FIGURE 19 which is a schematic representation of the patch panel of cabinet 43. Each of the numbers vertically listed downward from 1 to 8 indicate that the patch panel horizontal rows are associated with solenoids and, therefore bins 1 to 8 respectively, all of which are numbered 70 in FIGURES 3, 4 and 5. A tp aeht are numbered 70 in FIGURES 3, 4 and 5. At the patch panel, the decision circuits are represented by the forty columns of clips numbered from left to right. Connection is made by inserting a diode (not to be confused with the diode to be tested) into the clips which are in the row of the desired bin and column of the desired decision circuit. The diodes should be inserted with the anode end up, which is represented symbolically in FIGURE 19 as the positive side up. These diodes serve as a diode pulse matrix which controls flip-flops 510 through pulse amplifiers 509.

As there are two diodes inserted in the patch panel row representing bin 1, one in column 5 and one in column 27, decision circuits 5 and 27 respectively will determine whether the diode to be tested meets the specifications. The diode under test, in order to fall into bin 1 must meet both tests, i.e., that associated with decision circuit 5 and 27.

Further, bin 2 has one diode in column 27 meaning that if a diode failed to meet the test associated with decision circuit 5, but could meet the test associated with decision circuit 27 it will fall into bin 2.

Similarly, a fourth diode has been clipped into column 20 of row 3, so that if a test diode failed to meet both tests associated with decision circuits 5 and 27 it might still meet the test associated with decision circuit 20 and thus be received by bin 3.

It may therefore be seen that the bins themselves account for the decreasing order of preference in meeting specifications. The most preferred or highest order specification would therefore be set using the decisions circuit clips in row 1, the next most preferred being row 2 and so forth down to 8. As in the sample patch panel setting of FIGURE 19 no diodes have been placed in any of the rows below row 3, all of the diodes failing to meet the specifications associated with rows 1, 2 and 3 will therefore fall into bin 4.

Of course, all of the rows could have been used, permitting any of 8 types of diodes to be segregated. A ninth bin is provided in cabinet 32 to receive all the diodes failing to meet the predetermined specification of bins 1 through 8. Bin 9 has no place on the patch panel as it never represents a test, it only receives the rejects if all of the other eight bins have been made active, else the first bin not to have been made active (i.e., have diodes in one or more of its clips) will receive all of the rejected diodes tested.

Let us now return to the first row associated with bin 1. If we assume that it is most desired to first segregate out all of the diodes which meet a prescribed forward current test and a reverse current test we may use regulators 350 and 352, for example, which are respectively the first forward voltage regulator and first reverse voltage regulator as may be seen in FIGURES 12 and 14.

Forward voltage regulator 350 is then set to the desired voltage by use of its associated potentiometer connected to +/−B, the dial for which is mounted upon the face of cabinet 33, which is one of the potentiometers designated 650 in FIGURE 1. The desired forward current specification is set by one of the helipots 600 of cabinet 41. In the example herein this has been taken as decision circuit 5. For example, this may be set to 36 milli- amperes. The decision circuit 5 switch, which may be considered to be exemplified by switch 170 of FIGURE 21, will be set to the position corresponding to the forward current test as shown. Therefore, during the time when the selected forward voltage is applied to the diode, the appropriate *t* pulse will be directed to gate 503 of decision circuit 5. As explained previously, if the diode meets the set specification, no effect on the associated solenoid relay occurs, contrariwise, if it does not, the associated solenoid relay is energized.

Similarly, the third regulator potentiometer 650 on cabinet three associated with regulator 352 may be set to some back voltage for the reverse current test, such as −50 volts. Decision circuit switch 171 of FIGURE 21 may represent that associated with decision circuit 27 and it will therefore have its contact arm 173 set to contact 3 as shown. Therefore, when the reverse voltage regulator 352 output is applied to the test diode, the appropriate *t*-pulse is directed to the gate 503 (see FIGURE 20) of decision circuit 27. If the reverse current specification as set by dial 600 on decision circuit 27 is more negative than the analog of the current passing through the diode, the resulting specification is met and the solenoid relay is not energized. If the opposite occurs, the solenoid is energized and a failure to meet specification is registered.

Equivalents of the above tests are thereafter completed so that all tests have either registered pass or fail. Then the actuate relay energizes the first solenoid whose associated solenoid relay had not been energized after the tests.

Then the entire cycle will be repeated for each succeeding diode until all of the diodes in the mechanical handler have been tested.

What is claimed is:

1. An apparatus for automatically segregating a plurality of unilaterally conducting electronic devices in accordance with certain predetermined direct current characteristics comprising: means for selectively individually presenting said devices to a test station at which the devices are held motionless in a predetermined position; means for serially performing at least two predetermined direct current electrical tests upon said devices in said test station, each test being of a different electrical parameter of said devices; and means for automatically discharging said devices from said test station and segregating said devices in response to said tests into at least two groups in response to said direct current tests, said two groups being of a different predetermined preference in accordance with the number of tests each device satisfies.

2. An apparatus for automatically sorting a plurality of unilaterally conducting electronic devices in accordance with certain predetermined direct current characteristics comprising: means for selectively individually presenting said devices to a test station at which the devices are held motionless in a predetermined position; means for serially performing at least two predetermined direct current electrical tests upon the device in said test station, each test being of a different electrical parameter of said devices; a plurality of receptacles coupled to said test station, each of said receptacles being adapted to receive all of those devices meeting at least one predetermined test, respectively; means for discharging said devices from said test station and for directing said devices subsequent to said electrical tests to each of said plurality of receptacles; and means for determining to which of said receptacles each of said devices is directed, said last named means being responsive to said direct current electrical tests, said last named means including means for selectively establishing a predetermined order of preference for said devices in accordance with the number of tests each device satisfies.

3. An apparatus for automatically segregating a plurality of unilaterally conducting electronic devices in accordance with certain predetermined direct current characteristics comprising: means for delivering said devices all arranged in a predetermined position; means for selectively individually delivering said devices at a predetermined rate to a test station at which the devices are held motionless in a predetermined position; means for serially performing at least two predetermined direct current electrical tests upon the device in said test station, each test being of a different electrical parameter of said devices; a plurality of receptacles coupled to said test station for receiving said devices subsequent to said test; each of said receptacles being adapted to receive all of those devices meeting at least one predetermined test; and means for automatically discharging said devices from said test station and directing said devices in response to said tests into the appropriate one of said receptacles, said last named means including means for selectively establishing a predetermined order of preference for said devices in accordance with the number of tests each device satisfies.

4. An apparatus for automatically sorting a plurality of diodes in accordance with certain predetermined direct current electrical characteristics comprising: means for receiving a plurality of diodes in random alignment and delivering said diodes all aligned in end-to-end relation, an inclined guideway having its upper end connected to the output of said means for receiving; a mechanical gate disposed in said guideway, said gate being adapted to discharge said diodes singly at a predetermined rate; carrier means for receiving said diodes from said gate and individually presenting said diodes to a test station at which the diodes are held motionless in a predetermined position; means for serially performing at least two predetermined direct current electrical tests upon said diodes in said carrier means while held motionless at said test station, each test being of a different electrical parameter of said diodes; a plurality of receptacles coupled to said carrier means for receiving said diodes subsequent to said tests, each of said receptacles being adapted to receive all of those devices meeting at least one predetermined test; and means for automatically discharging said diodes from said test station and directing said diodes in response to said tests into the appropriate one of said receptacles, said last named means including means for selectively establishing a predetermined order of preference for said devices in accordance with the number of tests each device satisfies.

5. An apparatus for automatically sorting a plurality of diodes in some order of decreasing direct current electrical performance characteristics, said apparatus comprising: means for receiving a plurality of diodes in random alignment and delivering said diodes all aligned end to end; an inclined guideway having its upper end connected to the output of said means for receiving; a mechanical gate disposed in said guideway; said gate being adapted to discharge said diodes singly at a predetermined rate; carrier means for receiving said diodes from said gate, and individually presenting said diodes to a test station at which the diodes are held motionless in a predetermined position; means for serially performing a plurality of direct current electrical tests upon said diodes in said carrier means while held motionless at said test station, each test being of a different electrical parameter of said diodes; a plurality of receptacles coupled to said carrier means for receiving said diodes subsequent to said tests; and means for automatically discharging said devices from said test station and successively directing said diodes into the appropriate one of said receptacles in decreasing order of electrical performance characteristics in response to said tests in accordance with the number of tests each diode satisfies.

6. An apparatus for automatically segregating a plurality of unilaterally conducting electronic devices in accordance with certain predetermined direct current characteristics comprising: means for selectively individually presenting said devices to a test station at which the devices are held motionless in a predetermined position; means for serially applying a plurality of predetermined direct current test voltages and currents to the device in said test station, each test being of a different electrical parameter of said devices; means for establishing predetermined standards for direct current test voltages and currents; means for comparing said standards with the voltage and current output from the device in the test station; and means for automatically discharging said devices from said test station and segregating said devices into a plurality of groups in response to the comparisons.

7. The apparatus of claim 6 wherein said means for establishing predetermined standards includes a manually adjustable potentiometer coupled to a fixed direct current potential source.

8. In an apparatus for automatically sorting a plurality of semiconductor diodes in some order of decreasing direct current electrical performance characteristics including means for selectively individually presenting said diodes to a test station, means for establishing predetermined standards for direct current test voltages and test currents, means for serially applying a plurality of predetermined direct current forward test voltages to the diode in said test station including a stepping switch coupled to a plurality of forward test voltage regulators, a regulator comprising: a high input impedance chopper stabilized direct current amplifier, a cathode follower coupled to the output of said chopper stabilized amplifier, feedback impedance means coupled between the input of said chopper stabilized amplifier and the output of said cathode follower, a unity gain direct current amplifier, second impedance means having one terminal thereof coupled to the input of said chopper stabilized amplifier and the other terminal thereof coupled to the output of said unity gain amplifier, precision impedance means coupled between ground potential and the input of said unity gain amplifier, and an input direct current potential source coupled to the input of said chopper stabilized amplifier, whereby a diode under test when coupled between the output of said cathode follower and the input of said unity gain amplifier may have the forward current flowing therethrough measured to a high degree of accuracy by measuring the voltage across said precision impedance means.

9. In an apparatus for automatically sorting a plurality of semiconductor diodes in some order of decreasing direct current electrical performance characteristics including means for selectively individually presenting said diodes to a test station, means for establishing predetermined standards for direct current test voltages and currents, means for serially applying a plurality of predetermined direct current reverse test voltages to the diode in said test station including a stepping switch coupled to a plurality of reverse test voltage regulators, a regulator comprising: a first direct current amplifier having a high input impedance, feedback impedance means coupled between the input and the output of said first direct current amplifier, a unity gain direct current amplifier, second impedance means having one terminal thereof coupled to the input of said first amplifier and the other terminal thereof coupled to the output of said unity gain amplifier, precision impedance means coupled between ground potential and the input of said unity gain amplifier, and a direct current potential source coupled to the input of said first amplifier, whereby a diode under test when coupled between the output of said first amplifier and the input of said unity gain amplifier may have the reverse current flowing therethrough measured to a high degree of accuracy by measuring the voltage drop across said precision impedance means.

10. In an apparatus for automatically sorting a plurality of semiconductor diodes in some order of decreasing direct current electrical performance characteristics including means for selectively individually presenting said diodes to a test station, means for establishing predetermined standards for direct current test voltages and test currents, means for serially applying a predetermined direct current in the reverse direction to the diode in said test station including a stepping switch coupled to a reverse voltage test regulator, said regulator comprising: a high input impedance direct current differential amplifier, first impedance means having one terminal thereof coupled to the input of said amplifier, a first output terminal coupled to the output of said amplifier, a second output terminal coupled to the other terminal of said first impedance means, second impedance means coupled between said second output terminal and ground potential, third impedance means coupled between said input of said amplifier and a first source of direct current potential, a voltage divider network consisting of first and second resistance means coupled between said first output terminal and a second direct current source of potential, said second potential being equal to the voltage $+V/k$ where $-V$ equals the voltage drop across said second impedance means when a test diode is placed between said first and second terminals and said first potential energizes said amplifier and where $k$ equals the ratio of the resistance of said first means in said voltage divider network to the sum of the resistances of said first and second means.

11. The apparatus defined in claim 6 wherein said means for comparing includes a differential amplifier for receiving the output signal from said means for establishing standards and the output from the device in said test station when it receives said predetermined direct current test voltage and current, said amplifier being adapted to produce an output signal which is representative of the difference between its input signals, a trigger circuit coupled to the output of said amplifier, said trigger circuit being adapted to produce an output signal only when the output signal from said amplifier reaches a critical level, a source of $t$ pulses, a gate circuit whose input is coupled to the output of the pulse source and said trigger circuit, said gate circuit being adapted to permit the passage therethrough of the $t$ pulse signal from the $t$ pulse source only when no input is being received from said trigger circuit, means coupled to said gate circuit for selectively directing the diode in the test station to a predetermined group in response to the output from said gate circuit.

12. A circuit for measuring the forward current flowing through a semiconductor diode when said diode has applied thereto a certain predetermined forward voltage, said circuit comprising: a chopper stabilized direct current amplifier having a high input impedance; a cathode follower coupled to the output of said chopper stabilized amplifier; resistance means coupled between the input of said chopper stabilized amplifier and the output of said cathode follower; a unity gain direct current amplifier; second resistance means having one terminal thereof coupled to the input of said chopper stabilized amplifier and the other terminal coupled to the output of said unity gain amplifier; precision resistance means coupled between ground potential and the input of said unity gain amplifier, whereby the forward current flowing through a test diode coupled between the output of said cathode follower and the input of said unity gain amplifier may be accurately determined upon the energization of the input of said chopper stabilized amplifier by a predetermined direct current potential by measuring the voltage across said precision resistance means.

13. A circuit for measuring the reverse current flowing through a semiconductor diode when said diode has applied thereto a certain predetermined reverse voltage, said circuit comprising: a first direct current amplifier having a high input impedance; resistance means coupled between the input and output of said first amplifier; a unity gain direct current amplifier; second resistance means having one terminal thereof coupled to the input of said first amplifier and the other coupled to the output of said unity gain amplifier; precision resistance means coupled between ground potential and the input of said unity gain amplifier, whereby the reverse current flowing through a test diode coupled between the output of said first amplifier and the input of said unity gain amplifier may be accurately determined upon the energization of the input of said chopper stabilized amplifier by a predetermined direct current potential by measuring the voltage across said precision resistance means.

14. A circuit for measuring the reverse voltage developed across a semiconductor diode when said diode has a certain predetermined reverse current flowing therethrough comprising: a direct current amplifier having a high input impedance; first resistance means having one terminal thereof coupled to the input of said amplifier; a first output terminal coupled to the output of said amplifier; a second output terminal coupled to the other terminal of said first resistance means; second resistance means coupled between said second output terminal and ground potential; third resistance means coupled between said input of said amplifier and a first source of direct current potential; a voltage divider network consisting of fourth and fifth resistance means coupled between said first output terminal and a second direct current source of potential, said second potential being equal to the voltage $$+V\left(\frac{K}{1}-K\right)$$

where $-V$ equals the voltage drop across said second resistance means when a test diode is placed between said first and second terminals, and said first potential energizes said amplifier and where $k$ equals the ratio of the resistance of said fourth resistance means to the sum of the resistance of said fourth and fifth resistance means.

15. The apparatus of claim 6 wherein said means for serially applying includes a plurality of voltage and current regulators and means for selectively coupling a predetermined number of said regulators in a predetermined order to the device in said test station.

16. The apparatus as defined in claim 2 wherein said means for selectively individually presenting said device to a test station includes: a mechanical handler; and means for determining the rate of presentment by said handler.

17. The apparatus of claim 1 wherein said last named means includes means for electrically orienting said device in said test station prior to the performance of said test.

18. An apparatus for automatically segregating a plurality of unilaterally conducting electronic devices in accordance with certain predetermined direct current characteristics comprising: means for selectively individually presenting said devices to a test station at which the devices are held motionless in a predetermined position; means for serially applying a plurality of predetermined direct current test voltages and currents to the device in said test station, each test being of a different electrical parameter of said devices; means for establishing predetermined standards for direct current test voltages and currents; means for comparing said standards with the voltage and current output from the device in the test station; means for determining a decreasing order of desirability of devices meeting said predetermined standards; and means for automatically discharging said devices from said test station and segregating said devices into a plurality of groups in response to the comparisons, said segregation being effected in said decreasing order of desirability.

19. Apparatus for measuring the current resulting from application of a voltage of a predetermined amplitude to an impedance of unknown value comprising, first and second test terminals between which said impedance is to be connected, an operational summing amplifier having its output connected to said first terminal, an inverter amplifier having its input connected to said second terminal and having its output connected to the input of said summing amplifier, an impedance of known value having one end connected to said second terminal, means to apply a predetermnied unidirectional potential difference between the other end of said known impedance and the input of said summing amplifier, and means to sense the potential drop across said known impedance as a measure of the current flow through said unknown impedance.

20. Apparatus for measuring a current characteristic of an asymmetrically conducting device comprising, an impedance of known value and a source of unidirectional potential connected in a series circuit between first and second test terminals adapted to have one of said asymmetrically conducting devices connected therebetween, means in said circuit to maintain the potential drop between said first and second terminals at a predetermined constant value independently of the magnitude of the impedance of the device connected therebetween, and means to sense the potential drop across said known impedance as a measure of the current flow through said device.

21. Apparatus for measuring a voltage characteristic of an asymmetrically conducting device comprising, first impedance means and a direct current amplifier connected in a series circuit between first and second test terminals adapted to have one of said asymmetrically conducting devices connected therebetween, a source of direct current potential connected to the input of said amplifier and between said input and said first impedance means, means for maintaining a constant voltage at said second test terminal when said asymmetrically conducting device draws current from said source of direct current, and means for cancelling the effect of said constant voltage so that voltage through said device may be accurately measured.

22. An apparatus for automatically segregating a plurality of unilaterally conducting electronic devices in accordance with certain predetermined direct current characteristics comprising: means for selectively individually presenting said devices to a test station; means for serially applying a plurality of predetermined direct current test voltages and currents to the device in said test station, said means including a stepping switch coupled to a plurality of direct current voltage regulators; means for establishing predetermined standards for direct current test voltages and currents; means for comparing said standards with the voltage and current output from the device in the test station; and means for automatically segregating said devices into a plurality of groups in response to the comparisons.

References Cited in the file of this patent
UNITED STATES PATENTS

| | | |
|---|---|---|
| 1,814,437 | DuMont | July 14, 1931 |
| 1,808,301 | Ferguson et al. | June 2, 1931 |
| 2,278,697 | Gould | Apr. 7, 1942 |
| 2,570,485 | Rieber | Oct. 9, 1951 |
| 2,748,347 | Flaherty | May 29, 1956 |
| 2,752,039 | Woodell | June 26, 1956 |
| 2,762,015 | McGrath | Sept. 4, 1956 |
| 2,769,143 | Banzhof et al. | Oct. 30, 1956 |
| 2,849,682 | Herr | Aug. 26, 1958 |
| 2,858,018 | Alexander | Oct. 28, 1958 |